Dec. 3, 1968  G. J. DOUNDOULAKIS ET AL  3,414,437
FLUID CIRCULATING BATTERY SYSTEM
Filed May 13, 1963  2 Sheets-Sheet 1
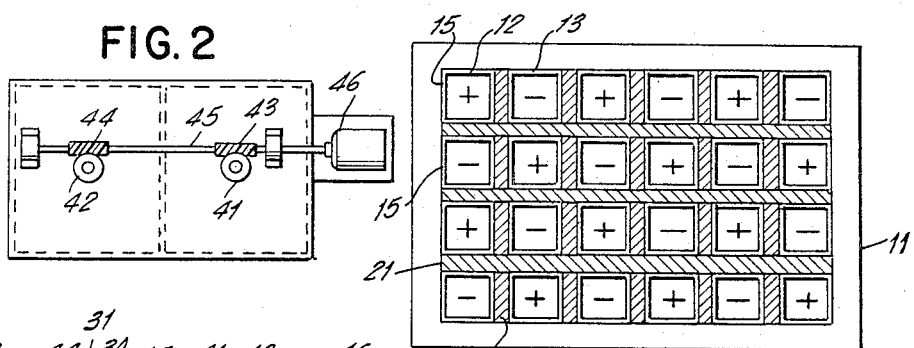
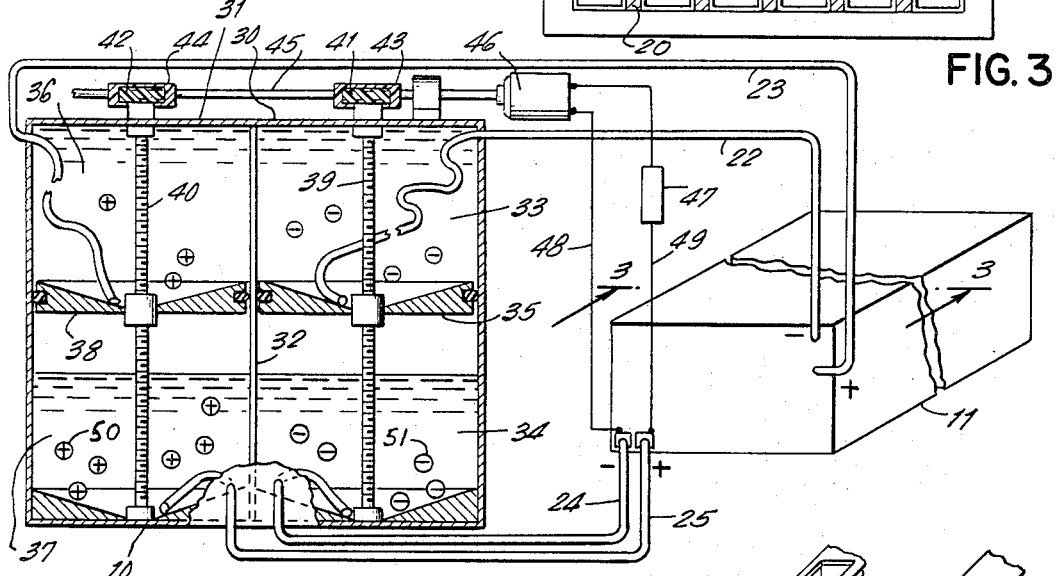
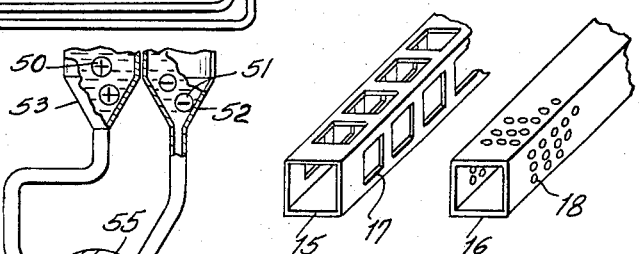
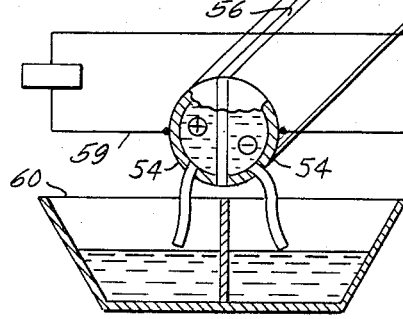
INVENTORS
GEORGE J. DOUNDOULAKIS
EMMANUEL CARATHANASSIS
BY
Constantine A. Michalos
ATTORNEY Dec. 3, 1968  G. J. DOUNDOULAKIS ET AL  3,414,437
FLUID CIRCULATING BATTERY SYSTEM
Filed May 13, 1963  2 Sheets-Sheet 2

INVENTORS
GEORGE J. DOUNDOULAKIS
EMMANUEL CARATHANASSIS
BY
Constantine A. Michalos
ATTORNEY United States Patent Office 3,414,437
Patented Dec. 3, 1968

3,414,437
FLUID CIRCULATING BATTERY SYSTEM
George J. Doundoulakis, Belmore, and Emmanuel Carathanassis, New York, N.Y., assignors to Electromechanical Devices, Inc., c/o Michalos & Michalos, New York, N.Y., a corporation of New York
Filed May 13, 1963, Ser. No. 279,748
8 Claims. (Cl. 136—6)

The present invention relates generally to storage battery systems, and more particularly to a fluid circulating storage battery system having a fluid electrolyte which interacts chemically and electrically with solid positive and negative substances, suspended in said electrolyte.

Heretofore, in conventional batteries, both fluid and solid substances, such as in the form of rigid fixed plates making up the storage battery, were confined inside a housing where they were charged and discharged. That is, basically the battery consisted of four elements; the positive solid material, the negative solid material, the electrolyte, which interacts with both and serves as an ionic transport inside the battery, and the metallic electrodes to which an external circuit may be attached.

The physical location of each of these elements, within the housing that contains them were constrained with respect to one another. In addition, the molecules on the surface of the solid material or plates were blocking the deeper layers of molecules within the solid material or plates. Porous plates were used to increase the effective working surface, but this did not expose the total available area of the material. Therefore, the conventional battery configuration presented an inefficient means of providing storage of electrical energy. That is, this arrangement restricted the amount of electric charge that could be stored by the amount of plate area available and, also by the amount of electrolyte contained inside the battery. Another disadvantage in using solid plates was that once the plates were damaged, the battery had to be replaced, and in addition, once the solid plates were polarized, the efficiency of the battery was considerably reduced.

The present invention provides a battery system in which the customary solid substances or plate anodic and cathodic materials used heretofore, such as lead and lead dioxide in the case of the lead-acid batteries, are given mobility and space in which to expose their maximum surface by being mixed in the electrolyte such as a solution of sulphuric acid in water in the case of lead-acid batteries. Therefore, this invention provides for the anodic and cathodic materials, complete freedom from being encased in a conventional housing. The mixture of anodic and cathodic materials with the electrolyte, can be stored in separate tanks to be supplied to the battery as a fuel. In this respect, the battery becomes an apparatus, or a machine which in effect uses the fuel from the tanks to supply the electrical conductors with positive or negative electrical charges during discharging of the anodic and cathodic substances present in the electrolyte.

In accordance with this invention, a battery system is provided which has a housing or casing, defining separate positive and negative chambers which contain respectively, anodic and cathodic substances in the electrolyte for circulation in said chambers. In addition, this invention provides solid metallic electrodes which come in contact with said anodic and and cathodic substances for exchange of electrical charges, means for confining said anodic and cathodic substances in separate chambers, and means for circulating the electrolyte and said anodic and cathodic substances contained in the electrolyte from positive and negative storage tanks to the positive and negative chambers respectively, to thereby provide continuously a fresh or semispent supply of electrically charged mixture of electrolyte and anodic and cathodic substances which react with each other chemically and by exchanges of positive and negative electrical charges with said metallic electrodes, an electrical potential is established which can sustain an electrical current in an outside electrical circuit.

It can be understood, therefore, that both the electrolyte and the anodic and cathodic materials of substances form mixtures which are introduced inside a battery cell system temporarily for chemical interaction and electronic exchange. The suspension is then recirculated until totally discharged. The spent mixtures can be recharged by the same or other similar battery systems by circulation through the cell system again, and with DC potential supplied by an outside source in reverse polarity.

It should be understood that in accordance with the present invention, the metallic electrodes do not interact chemically with the electrolyte, but serve primarily as pick-up elements which serve to supply or receive electric charges from the anodic and cathodic substances. Therefore, the amount of charge that may be stored depends on the amount of mixtures available. The mixtures may be thought of as fuel containing electrical energy and the housing, with the electrodes, may be thought of as an apparatus capable of extracting the energy in the fuel in the process of a chemical reaction, movement of ions, and exchange of electrical charges taking place in said apparatus. Here the reverse may also be accomplished, in that the fuel may be re-energized by inserting electric energy into the apparatus to be picked up by the mixtures.

For example, from the foregoing, it will be seen that an electric automobile can be driven to a gas station to be filled up with charged mixtures of anodic and cathodic substances and electrolyte instead of gasoline in the case of conventional automobiles. Here, the attendant can retain the spent mixtures for recharging and resale. Since the present invention provides a fuel that can receive electrical energy, the spent mixture may be charged at home by connecting the system into the existing home electric circuit. Therefore, for short drives, the automobile operator need not stop at a gas station, but can supply his automobile in effect with fuel from the power line of his house.

There are numerous other uses where the present fluid circulating battery system can be applied. It may have direct application as a submarine battery and any other storge battery used to store and supply relatively large amounts of electrical energy. It may also be employed as a means of energy storage, whereby the energy is stored at slow rate into the fluid mixture in the form of electricity to be recovered at a later time. For example, solar cells may be used to capture solar energy and convert it into electricity, which may be stored by means of this battery system. The solar energy thus converted into electrical energy, can then be used during periods of absence of sunlight. Another use for this battery system may be in the storage and transportation of electrical energy from places where such energy is plentiful, such as from hydroelectric plants, to places where there is a shortage of energy. Large transport means can be used to bring the charged mixtures to remote areas to be used as fuel. This means of moving stored energy to remote areas is a valuable consideration for military installations such as in the northern regions and mountainous and desert areas. Some of the foregoing considerations are of extreme importance, since the world's fuel reserves are being rapidly exhausted and there is need for storing and transporting energy.

Accordingly, it is an object of this invention to provide an improved electrical energy storage and recovery system having mixtures of anodic and cathodic materials operable to move and be exposed for efficient chemical interaction with an electrolyte, to provide therewith a maximum interacting surface for the generation of electric energy.

Another object of this invention is to provide a fluid circulating battery system having an unlimited source of mixtures of anodic and cathodic materials with electrolyte, operable to be continuously supplied as a fuel to a discharging or charging apparatus, employed as a machine for energy conversion.

Still another object of this invention is to provide a circulating fluid battery system using a fuel mixture of anodic and cathodic materials and an electrolyte operable as an efficient storge means for electricl energy to be transported from one location to another.

A further object of this invention is to provide a fluid battery system having separate positive and negative chambers separated by semipermeable material which acts both as an ionic filter and as a separator to allow passage of ions and to prevent migration of anodic and cathodic materials which are mixed with the electrolyte and which includes electrode means having circulating means to circulate the electrolyte within the respective positive and negative chambers.

A further object of this invention is to provide a battery system having storage means separated into two chambers containing positive and negative suspensions respectively, and each chamber further divided into two smaller compartments by a movable diaphragm operable by screw means for moving said diaphragm in one direction to increase the size of one compartment while decreasing the other, thus forcing the suspension out of one compartment through the cell system into the other compartment and operable to reverse the movement of the diaphragm to reverse the flow of its respective suspension.

A further object of this invention is to provide a fluid battery system having electrodes in the form of blades for circulating suspensions of positive and negative charged solid materials in an electrolyte, in closed fluid circuits comprising positive and negative chambers and having filter means interposed between said chambers for preventing migration of the anodic and cathodic material from one chamber to the other chamber and further having means for completely replenishing of the electrolyte and anodic and cathodic matreials after the mixtures have been run down by a predetermined amount.

Other objects and features of the invention will appear as the description of the particular physical embodiments selected to illustrate the invention progresses. The various features of novelty which characterize the invention are pointed out with particularity in the claims annexed to and forming a part of this specification. In addition, for a better understanding of the invention, its operating advantages and specific objects attained by its use, reference is made to the accompanying drawing and descriptive matter in which there is illustrated and described preferred embodiments of the invention.

FIGURE 1 is a front elevational view partly in perspective and partly in section, of a preferred embodiment of the invention;

FIGURE 2 is a fragmentary plan view of the device shown in FIGURE 1;

FIGURE 3 is a sectional view taken along line 3—3 of FIGURE 1;

FIGURE 4 is an enlarged perspective view of an element of the device shown in FIGURES 1 to 3;

FIGURE 5 is a perspective view of another embodiment of the invention; and,

Figure 6:
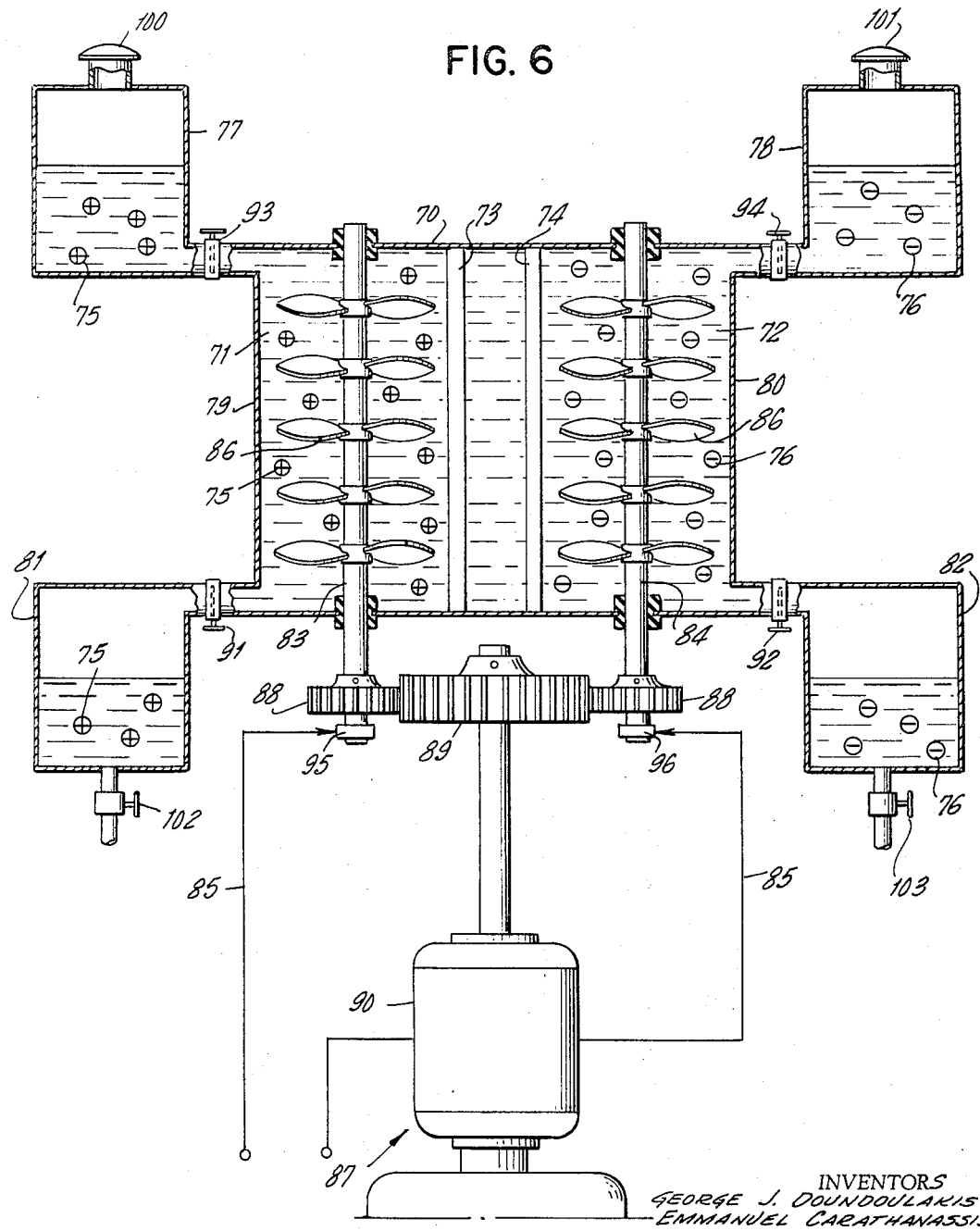
FIGURE 6 is a front elevation of still another embodiment of the invention.

FIGURES 1 to 4 show one preferred embodiment of the invention, FIGURE 5 shows another embodiment of the invention and FIGURE 6 shows still another embodiment of the invention. FIGURES 1 to 4 show a fluid battery system having a heart-like pumping system operating at a slow rate of motion, as herein more fully described, circulating the mixtures of anodic and cathodic materials in electrolyte traveling through a casing having a plurality of cells comprising a two-chamber system, one chamber containing anodic material in the electrolyte, the other the cathodic material in the electrolyte.

FIGURE 5 shows a simplified embodiment, employing gravity as the means of propagating the suspensions through a single cell.

FIGURE 6 shows a fluid battery system having metallic electrodes in the form of blades or screws rotatable to provide circulation of the electrolyte mixed with anodic and cathodic materials throughout their respective positive and negative chambers.

The circulation, which may be either continuous or intermittent, is provided to keep the fluid in motion so that each mixture can come in contact with its respective metallic electrode for electronic exchange.

In addition, all the embodiments include systems having connections to reservoirs for storing required amount of mixtures of electrolyte with anodic and cathodic materials which can be fed into the respective positive and negative chambers. During the circulation or recirculation, means are used to cause circulation of the mixtures for adequate discharge of the electrolyte and contained anodic and cathodic materials. Therefore, as brought out before, a feature of one embodiment is to use screws to drive a diaphragm for circulation of the suspensions and a feature of the second embodiment is to use gravity as a propagating means, while the third embodiment employs the rotation of the electrode members, provided with screws or blades for the circulation of the mixtures. The power for driving the means for circulations is accomplished by a single low horsepower motor driving the circulating means through a suitable gear arrangement.

Referring to FIGURES 1 to 4 in particular, the invention embodied therein comprises a circulating fluid battery system having a casing or housing 10 operable as a pumping unit and a storage tank and a cell 11 comprising several basic positive elements 12 and negative elements 13, each connected in tandem with all other elements of same polarity. It should be noted that this type of mechanical connection amounts to a parallel electrical connection. Here the basic elements 12 and 13 are placed in a checkerboard cross sectional pattern, as best shown in FIGURE 3, so that each positive element 12 can interact with its adjacent negative elements 13 at all sides, and vice versa. Diagonally adjacent regions of same polarity are interconnected at the end portion of the cell by means of standard 180° U bends (not shown). Each mixture has thus the opportunity of running through all elements of the cell, of its particular polarity, during each pass. For rigidity and ease of manufacture, each region of a basic element can consist of a stainless steel or non-corrosive metallic rectangular tubular conductors or electrodes 15 or 16 having rectangular openings 17 or perforations 18 respectively, as shown in FIGURE 4. The openings 17 and 18 are provided on the metallic wall to permit ionic transport between the positive and negative chambers. The tubes, such as tubes or electrodes 15, can be assembled into one cell by stacking them together to form a checkerboard cross-sectional configuration as best shown in FIGURE 3. Next, the tubes or electrodes 15 of similar polarity are interconnected by inserting at their ends the U bends (not shown). The U bends may then be secured to the tubes by brazing to form a continuous fluid and electrical connection. Interposed between the tubes are sheets of vertical filter separator material 20 and sheets of horizontal filter separator material 21. The entire cell assembly 11 can then be placed in a leak-proof container. Connecting the supply tank and the cell are four tubes 22, 23, 24 and 25. The tubes interconnect the cell 11 and the pumping unit or storage tank 10. The tank 10 has a pair of chambers 30 and 31 separated by a common wall 32 and each chamber further divided into two compartments. The negative chamber is divided into an upper compartment 33 and a lower compartment 34 by a vertically movable diaphragm 35, and the positive chamber is divided into an upper compartment 36 and a lower compartment 37 by a vertically movable diaphragm 38. The diaphragms 35 and 38 are movable by vertical screws 39 and 40 axially connected to worm gears 41 and 42 respectively, which in turn are driven by worm wheels 43 and 44. The worm wheels 43 and 44 are connected to a common shaft 45 which is powered and rotated in a clockwise or counterclockwise direction by a motor 46, to move the diaphragms upwardly or downwardly. For example, when the diaphragms are moving upwardly, the mixture containing the cathodic material can circulate from its upper compartment 33 through its tube 22 and into the cell system 11 for chemical interaction with the mixture containing the anodic material and electronic exchange with the tubular electrodes 15. Next, the mixture containing the cathodic material leaves the cell system 11 through its tube 24 and returns to the tank 10 into its lower compartment 34 for recirculation when the diaphragm 35 reaches its uppermost position and starts its downward movement. The mixture containing the anodic material is likewise circulated through its chamber system by its diaphragm 38 driven by the motor and gear system as described. The mixture containing anodic material can also be recirculated when the motor is reversed to move the diaphragm 38 in the opposite direction. The motor 46 may be driven by being connected in series to a load 47 and then being automatically reversed by limit switches (not shown). The electric current produced by the circulation of the mixtures can then be conducted by conductors 48 and 49 connected to the negative and positive tubular electrodes 15.

It should be understood that in this invention the anodic material 50 and the cathodic material 51 may take the form of thin-walled bubbles or hollow light-weight beads. The anodic and cathodic materials may take such forms by blowing the metal into hollow beads and treating them chemically when required, or by depositing the anodic or cathodic material on the surface of thin-walled, nonmetallic beads after they are chemically treated when required. The anodic and cathodic materials may also take a granular form or any other form which can fulfill the purpose of this invention of allowing the anodic and cathodic materials to expose a large area to the electrolyte.

Referring to FIGURE 5, the storage tank system comprises a mixture of electrolyte with cathodic material 51 and a positive chamber 53 having a mixture of electrolyte with anodic material 50. These mixtures may be propagated by gravity through metallic electrodes 54, forming a cell 55 which is divided by a filter separator material 56 into a negative chamber 57 and a positive chamber 58 for ionic interaction with each other and electronic exchange with the external metallic electrodes 54 through an external circuit 59. The spent mixtures can then be collected in a container 60 for reuse if desired.

Referring to FIGURE 6 in particular, the invention embodied therein includes a battery system comprising a battery casing or housing 70 having walls defining a positive electrode region or chamber 71 at one side of the system and a negative electrode region or chamber 72 at the other side, separated by a pair of filter separator materials 73 and 74. Each of the regions 71 and 72 are filled with mixtures such as hereinbefore described. That is, the electrolyte in region 71 holds in suspension solid anodic material 75 corresponding to the anodic material used in standard batteries and the electrolyte in region 72 holds in suspension solid cathodic material 76 corresponding to the cathodic material used in standard batteries.

In accordance with the invention, the positive electrode chamber 71 and the negative electrode chamber 72 are isolated by the filter separator materials 73 and 74 which permit flow of the ions and cations throughout the electrolyte but prevent the flow of the solid anodic or cathodic materials from migrating from one chamber into the other.

In this embodiment the device has the positive and negative chambers provided with a gravity flow path from storage tanks 77 and 78 through central portions 79 and 80 of the positive and negative chambers and to the spent tanks 81 and 82. The electrolyte and the suspended solids 75 and 76 within the electrolyte in each of the chambers circulate within the central portions 79 and 80 of the chambers until most of their electric charge is transferred to a pair of electrodes 83 and 84 and through an external circuit 85.

To provide for circulation of the suspended substances, in the electrolyte, and thus provide the electric exchange, the electrodes 83 and 84 carry blades or screws 86. The electrodes are rotated by a motor and gear system 87 which is powered by electric current generated by the battery system itself, as shown in FIGURE 6. Each of the electrodes 83 and 84 is rotatably supportetd on the top and on the bottom walls of the housing 70 and extends downwardly of the bottom wall and is axially connected to a gear 88. A central gear 89 axially connected to a motor 90 of the motor and gear system 87 is driven by the motor to rotate the electrodes 83 and 84 to agitate the mixtures by the blades 86. In order to keep from shorting the electrodes 83 and 84, at least one of the gears 88 and 89 must be made of or coated with insulating material. The electrodes 83 and 84 and the blades 86 are made of metallic conductor material which will not oxidize within the electrolyte. In addition, the housing can be made of dielectric material or it can be made of metal and internally coated with a dielectric material. It should be understood that if the housing is made of metal, proper electrical insulation between the chambers would be introduced. In any case, the electrodes should not be short circuited.

It should also be understood that in this device the electrodes may be stationary and the solid matetrials circulatetd within the electrolyte by a separate means as hereinbefore described.

The operation of the apparatus just described is simple. The spent mixtures are removed from the central portions 79 and 80 of the positive and negative chambers to the spent tanks 81 and 82 by opening valves 91 and 92. The valves 91 and 92 can then be closed to permit a fresh supply of mixtures from the storage tanks 77 and 78 to enter and be contained within the central portions 79 and 80 by opening valves 93 and 94. The fresh supply of mixtures can then contact the rotating blades and electrodes 83 and 84. Then the electric current is picked up through slip rings 95 and 96 and sent to the external circuits 85 to run the motor and a load (not shown).

As can be noted, a feature of the invention is the provision of a means for completely replenishing the electrolyte and the anodic and cathodic materials. For this purpose there is the tank 10 of the device shown in the first embodiment, the hoppers 52 and 53 and the container 60 as shown in the second embodiment, and the tanks 77, 78, 81 and 82 of the device shown in the third embodiment. Means can be used for the purpose of providing for the control of the circulation in each device, such as shown by the tanks 77, 78, 81 and 82, having the valves 91, 92, 93 and 94 shown in FIGURE 6. When there is need to refill the center portions 79 and 80 of the chambers 71 and 72 with new material, valves 93 and 94 are opened to permit the spent material to enter their respective spent tanks as hereinbefore described. Vent screw caps, such as caps 100 and 101, as shown in FIGURE 6, may be used for refilling the storage tanks. In addition, drainage valves, such as valves 102 and 103, may be used to drain the spent material.

The invention described may again be varied in construction within the scope of the claims, for the particular devices selected to illustrate the invention are but three of many possible embodiments of the same. The invention, therefore, is not to be restricted to the precise details of the structure shown and described.

What is claimed is:

1. A battery comprising means defining a positive electrode chamber and a negative electrode chamber ionically connected to said positive electrode chamber, fluid electrolyte in said positive and negative electrode chambers electrically charged polarized cathodic and anodic materials of the solid particle type for the respective polarities movably carried in suspension in said fluid electrolyte in each of the respective chambers, ionically permeable filter means separating said positive and negative electrode chambers and preventing movement of said cathodic and anodic materials from one chamber to the opposite chamber while permitting movement of anions and cations between the chambers, and an electrode terminal means in each of said chambers operable to allow said suspended cathodic and anodic materials to exchange electrical charges therewith.

2. The structure of claim 1, including a first storage means operable to contain a supply of a first mixture of said anodic material and electrolyte, a second storage means operable to contain a supply of a second mixture of said cathodic material and electrolyte, said first storage means connected to supply said first mixture to said positive electrode chamber, said second storage means connected to supply said second mixture to said negative electrode chamber, outlet means connected to each electrode chamber, and separate means respectively connected for movement in said first and second mixture for circulating said mixtures from said storage means through the respective chambers and out of said outlet means.

3. The structure as set forth in claim 1 in which said chambers comprise a plurality of longitudinally extending tubes, arranged in a checkerboard cross-sectional pattern, all of said tubes separated from each other by said filter means forming a plurality of separate chambers, alternate adjacent tubes and separate chambers being connected in tandem to form said positive and negative chambers and operable for reacting with opposite polarity tubes, and said tubes being apertured substantially throughout the lengths thereof thereby providing peripheral ionic interaction between adjacent tubes.

4. The structure as set forth in claim 1 in which said positive and negative electrode chambers comprise a metallic tube having a length greater than the diameter thereof, and said filter separator means connected longitudinally of said tube and dividing said tube into said separate positive and negative chambers.

5. In a battery as set forth in claim 1 in which said cathodic and anodic materials comprise light weight beads and particles of solid anodic and cathodic substances attached to the surfaces of said beads.

6. The structure of claim 1 in which said solid anodic and cathodic materials comprise bubbles of anodic and cathodic metals for floating in suspension in said electrolyte.

7. A battery as set forth in claim 2 in which said separate means comprise lineally movable pump means respectively connected in said first and second storage means.

8. A fluid circulating battery comprising a positive electrode chamber and a negative electrode chamber ionically connected so said positive electrode chamber, a pumping means including a positive storage chamber and a negative storage chamber, a movable diaphragm dividing each of said storage chambers into a pair of compartments, inlet and outlet means for said positive and negative electrode chambers, a first solution of fluid electrolyte and electrically charged anodic particles of the solid type carried in suspension therein in said positive storage chamber, a second solution of fluid electrolyte and electrically charged cathodic particles of the solid type carried in suspension therein in said negative storage chamber, said inlet and outlet means of each electrode chambers connected to opposite compartments of the respective positive and negative storage chambers, power means operable to move said diaphragms to decrease the size of one compartment while increasing the size of the other compartment in each storage chamber to thereby circulate said first and second solutions from the respective storage compartments through the respective positive and negative chambers and back to the opposite storage compartments, filter separator means connected between said positive and negative electrode chambers preventing movement of said cathodic and anodic particles from one chamber to the opposite chamber while permitting movement of ions and cations between the chambers, and an electrode means connected in each of said positive and negative electrode chambers for exchange of electronic charges with said suspended cathodic and anodic particles as they are circulated through said electrode chambers.

References Cited

UNITED STATES PATENTS

| 2,102,701 | 12/1937 | Gyuris. | |
| 3,235,407 | 2/1966 | Nicholson et al. | 136—86 |
| 3,260,620 | 7/1966 | Gruber | 136—83 X |
| 2,700,063 | 1/1955 | Manecke | 136—153 X |
| 2,706,213 | 4/1955 | Lucas. | |
| 2,786,088 | 3/1957 | Robinson | 136—153 X |
| 2,831,045 | 4/1958 | Harding | 136—153 X |
| 3,120,456 | 2/1964 | Broers | 136—153 X |

WINSTON A. DOUGLAS, *Primary Examiner.*

A. SKAPARS, *Assistant Examiner.*